United States Patent
Haas et al.

(10) Patent No.: US 12,198,332 B2
(45) Date of Patent: Jan. 14, 2025

(54) SYSTEMS AND METHODS FOR REFINING TRAINING DATA

(71) Applicant: Siemens Healthineers International AG, Steinhausen (CH)

(72) Inventors: Benjamin Haas, Roggwil (CH); Angelo Genghi, Wettingen (CH); Mario Joao Fartaria, Palo Alto, CA (US); Simon Mathias Fluckiger, Lenzburg (CH); Anri Friman, Espoo (FI); Alexander Maslowski, Peachtree City, GA (US)

(73) Assignee: Siemens Healthineers International AG, Steinhausen (CH)

( * ) Notice: Subject to any disclaimer, the term of this patent is extended or adjusted under 35 U.S.C. 154(b) by 484 days.

(21) Appl. No.: 17/488,183

(22) Filed: Sep. 28, 2021

(65) Prior Publication Data

US 2023/0100179 A1   Mar. 30, 2023

(51) Int. Cl.
*G06T 7/00* (2017.01)
*G06F 18/214* (2023.01)
(Continued)

(52) U.S. Cl.
CPC ......... *G06T 7/0012* (2013.01); *G06F 18/214* (2023.01); *G06N 20/20* (2019.01);
(Continued)

(58) Field of Classification Search
None
See application file for complete search history.

(56) References Cited

U.S. PATENT DOCUMENTS 10,699,412 B2 *   6/2020   Dai ................. G06F 18/2431
2018/0260957 A1 *  9/2018   Yang ..................... G06T 7/143
(Continued)

OTHER PUBLICATIONS

Albarquoni, Shadi et al.: "AggNet: Deep Learning From Crowds for Mitosis Detection in Breast Cancer Histology Images", IEEE Transactions on Medical Imaging, IEEE, USA, vol. 35, No. 5, May 1, 2016, pp. 1313-1321, XP011611248, ISSN: 0278-0062, DOI: 10.1109/TMI.2016.2528120 [retrieved on May 21, 2016].

(Continued)

*Primary Examiner* — Tahmina N Ansari
(74) *Attorney, Agent, or Firm* — Foley & Lardner LLP

(57) ABSTRACT

Embodiments described herein provide for training a machine learning model for automatic organ segmentation. A processor executes a machine learning model using an image to output at least one predicted organ label for a plurality of pixels of the image. Upon transmitting the at least one predicted organ label to a correction computing device, the processor receives one or more image fragments identifying corrections to the at least one predicted organ label. Upon transmitting the one or more image fragments and the image to a plurality of reviewer computing devices, the processor receives a plurality of inputs indicating whether the one or more image fragments are correct. When a number of inputs indicating an image fragment of the image fragments is correct exceeds a threshold, the processor aggregates the image fragment into a training data set. The processor trains the machine learning model with the training data set.

20 Claims, 3 Drawing Sheets

(51) Int. Cl.
*G06N 20/20* (2019.01)
*G06T 7/11* (2017.01)

(52) U.S. Cl.
CPC ...... *G06T 7/11* (2017.01); *G06T 2207/10081* (2013.01); *G06T 2207/20081* (2013.01)

(56) References Cited

U.S. PATENT DOCUMENTS

| | | | |
|---|---|---|---|
| 2018/0276825 A1* | 9/2018 | Dai | G06T 7/11 |
| 2018/0300576 A1* | 10/2018 | Dalyac | G06N 7/08 |
| 2019/0095800 A1* | 3/2019 | Asbag | G06F 18/243 |
| 2022/0184421 A1* | 6/2022 | Hakala | G16H 20/40 |
| 2023/0100179 A1* | 3/2023 | Haas | G06V 10/7747 382/159 |

OTHER PUBLICATIONS

International Search Report and Written Opinion on PCT Appl. Ser. No. PCT/US2022/043200 dated Nov. 29, 2022 (15 pages).

Tobias Heimann et al.: "A Shape-Guided Deformable Model with Evolutionary Algorithm Initialization for 3D Soft Tissue Segmentation", Jul. 2, 2007, Information Processing In Medical Imaging;[Lecture Notes In Computer Science; LNCS], Springer Berlin Heidelberg, Berlin, Heidelberg, pp. 1-12, XPO019063147, ISBN: 978-3-540-73272-3 abstract: figure 1, section 3.1; section 2.3, section 3.6.

International Preliminary Report on Patentability for PCT App. PCT/US2022/043200 dated Apr. 2, 2024 (9 pages).

\* cited by examiner

SYSTEMS AND METHODS FOR REFINING TRAINING DATA

TECHNICAL FIELD

This application relates generally to crowdsourcing corrections to outputs of a machine learning model to train the machine learning model for image segmentation and contouring.

BACKGROUND

Radiotherapy (radiation-based therapy) is used as a cancer treatment to emit high doses of radiation that can kill cells or shrink a tumor. The target region of a patient's body that is intended to receive radiation (e.g., a tumor) is referred to as the planning target volume (PTV). The goal is to deliver enough radiation to the PTV to kill the cancerous cells during the radiotherapy treatment. However, other organs or anatomical regions that are adjacent to, or surrounding, the PTV can be in the way of radiation beams and can receive enough radiation to damage or harm such organs or anatomical regions. These organs or anatomical regions are referred to as organs at risk (OARs). Usually, for radiation therapy treatment planning (RTTP), a physician or a radiologist identifies both the PTV and the OARs prior to radiotherapy using, for example, computed tomography (CT) images, magnetic resonance imaging (MM) images, positron emission tomography (PET) images, images obtained via some other imaging modality, or a combination thereof. For instance, the physician or the radiologist may manually mark the PTV and/or the OARs on the medical images of the patient.

It can be important to accurately identify organs in images so physicians can accurately configure radiotherapy machines to direct radiation to the right organs without affecting the organs at risk. Typically, to account for such risks, a physician may use a contouring software to outline images of individuals based on what the physician believes to be are the individual's organs. Such a process may take a large amount of time and may result in inaccuracies given the poor quality of some images. Inaccurate contouring may cause a radiotherapy machine to direct radiation to an OAR or another region of a person entirely during radiotherapy treatment. For example, a physician may incorrectly outline an organ within an image when determining field geometry settings to use to configure a radiotherapy machine providing treatment to a patient. Thus, typical methods of contouring images may cause inaccurate results and, in some cases, improper patient treatments.

SUMMARY

For the aforementioned reasons, there is a desire for a system that can train a computer model (e.g., a machine learning model) to accurately contour images of individuals to indicate the locations of the organs, bones, and/or any tumors on the organs or bones. However, systems that use machine learning models to contour images often have issues generating training data sets that either have enough contoured images to train the respective models or have accurate training data. For example, while a clinician may be careful to contour images of a patient in areas that are being treated, the clinician may be less careful or fail to contour other areas of the images. Conventional systems may account for these deficiencies by discarding the poorly contoured images or by simply feeding these images into models for training. Such methods may result in poorly trained models either because not enough training data is available (which may be a common problem for models trained based only on images captured at a clinic local to the machine learning model) or because the models are improperly biased or weighted based on the inaccurate training data. Thus, there is a need to properly curate training data without discarding potential training data while ensuring the models are accurately trained.

Previous systems that have attempted to overcome these deficiencies have relied on experts in the contouring field to curate training data. These experts may review various completely contoured images and determine whether the contours are accurate. Such experts may obtain these images from various clinics as a special process because clinics do not generally generate high-quality completely contoured images during routine clinical treatment planning when treating a specific organ (e.g., only specific portions of an image may be accurately contoured during typical treatment). Because completely contoured images are generally not available to experts, it can take a large amount of time to accumulate enough training data to sufficiently train machine learning models for contouring.

To overcome these deficiencies, it is desirable to train a machine learning model in small increments using a continuous collaborative process. Instead of relying on experts to obtain and curate completely contoured images to train a machine learning model, the systems and methods described herein may identify incorrect predictions from the machine learning model and train the machine learning model based only on corrections to the incorrect predictions. The system is able to crowdsource the corrections to the incorrect predictions in a multi-step process in which a corrector may review a contouring output from the machine learning model, identify incorrect predictions, create image fragments that indicate the correct contouring, and transmit the corrections in the fragments to multiple reviewers. The reviewers may review the corrections and provide inputs for each fragment indicating whether they agree with the corrections. For any fragments that meet a selection criteria (e.g., a number of reviewers that agree with the correction of the fragment that exceeds a threshold), the system may add the fragments to a training data set and use the data set for supervised training, discarding or archiving any fragments that do not meet the selection criteria. Given the criteria that must be met for any data to be added to the data set, this training data set curation process may enable the system to create a training data set that is more accurate than previous processes, which may improve and speed up training. Thus, the systems and methods described herein provide for a method of incrementally training a machine learning model for organ contouring using a crowdsourced training data set.

In one embodiment, a method for training a machine learning model for automatic organ segmentation may comprise executing, by the processor, a machine learning model using an image to output at least one predicted organ label for a plurality of pixels of the image; determining, by the processor, that the at least one predicted organ label requires a correction; upon transmitting the at least one predicted organ label to a correction computing device, receiving, by the processor from the correction computing device, one or more image fragments identifying corrections to the at least one predicted organ label; upon transmitting the one or more image fragments and the image to a plurality of reviewer computing devices, receiving, by the processor from the plurality of reviewer computing devices, a plurality of inputs indicating whether the one or more image fragments are correct; when a number of inputs indicating an image fragment of the one or more image fragments is correct exceeds a threshold, aggregating, by the processor, the image fragment into a training data set; and training, by the processor, the machine learning model with the training data set.

In another embodiment, a system for training a machine learning model for automatic organ segmentation, the system may comprise one or more processors configured to execute a machine learning model using an image to output at least one predicted organ label for a plurality of pixels of the image; upon transmitting the at least one predicted organ label to a correction computing device, receive, from the correction computing device, one or more image fragments identifying corrections to the at least one predicted organ label; upon transmitting the one or more image fragments and the image to a plurality of reviewer computing devices, receive, from the plurality of reviewer computing devices, a plurality of inputs indicating whether the one or more image fragments are correct; when a number of inputs indicating an image fragment of the one or more image fragments is correct exceeds a threshold, aggregate the image fragment into a training data set; and train the machine learning model with the training data set.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Figure 1:
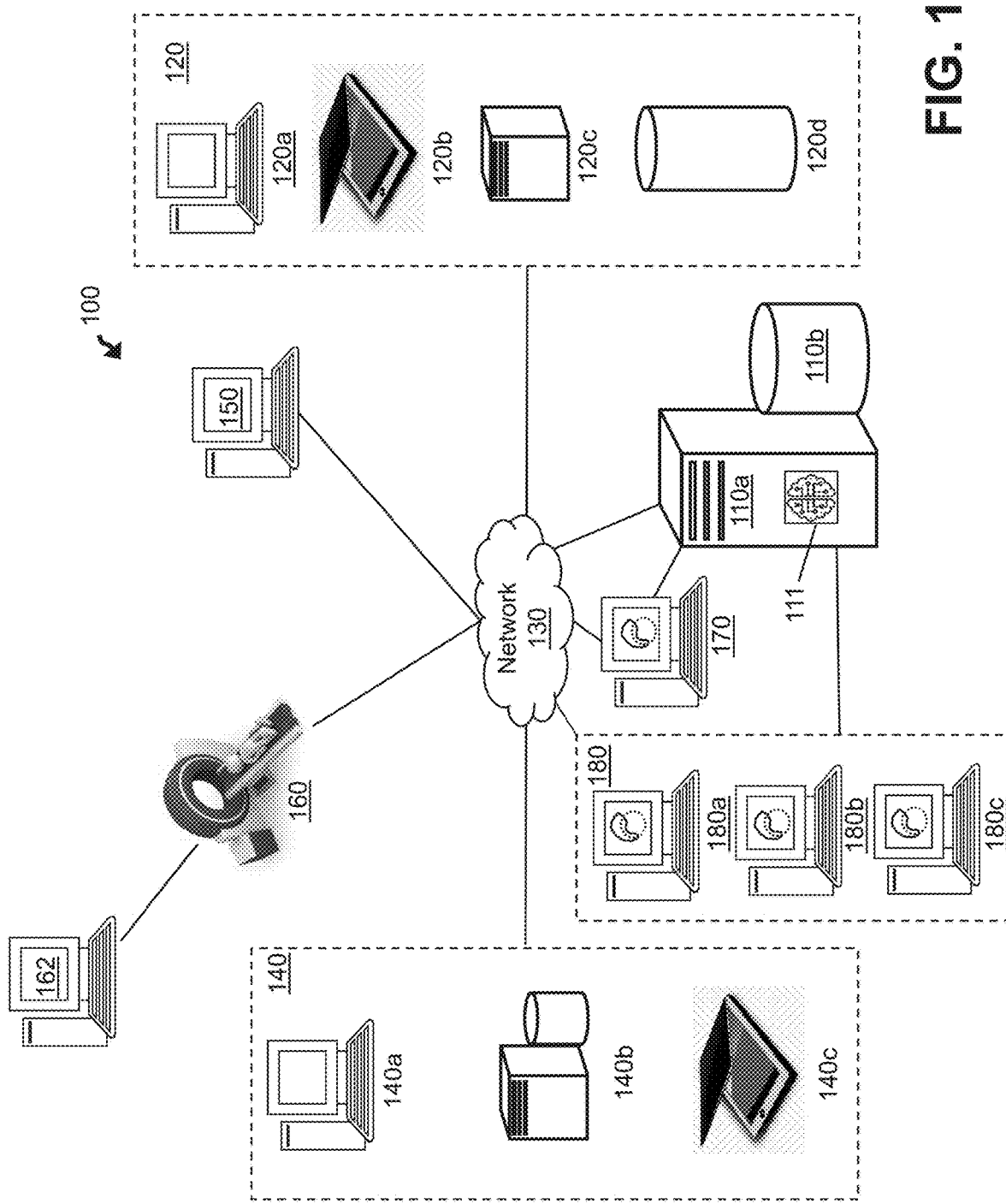
FIG. 1 illustrates components of an organ contouring segmentation system, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

The present state of training a machine learning model for image contouring as the model is used in a production environment can be time-intensive and costly. For example, a system may deploy a machine learning model that has been trained to contour images of organs from CT scans for images that are taken at various radiotherapy clinics. Employees at the radiotherapy clinics may review the contoured CT scans and identify errors in the contouring. The radiotherapy clinics may report these errors to the entity that provides the machine learning model. The entity may review the reports for each of the errors and attempt to train the machine learning model to address the errors; however, doing so can quickly become unmanageable as the number of errors may quickly multiply and be difficult to address individually given the number of radiotherapy clinics that may request contouring. Any attempts to address the errors may require a review process and some determination for the best method to train the machine learning model to avoid making similar errors in the future. Such attempts are often futile given the complexity of standard machine learning models and the difficulty in resolving specific cases in which the machine learning model fails to make the correct predictions.

To address the aforementioned technical deficiencies, a server (referred to herein as an analytics server) is described herein that can semi-automatically and continuously train a neural network or another machine learning model using a crowdsourcing process to contour images of organs for RTTP planning in a production environment. In a non-limiting example, the server may execute a machine learning model to obtain organ contouring predictions for an image in response to a request from a radiotherapy clinic. The server may transmit the predictions to the radiotherapy clinic. The radiotherapy clinic may send the server a marked-up version of the contoured image indicating errors in the predictions. The server may send the marked-up version of the contoured image to a corrector at a correction computing device, whom may identify the markings and upload corrections (e.g., image fragments) to the incorrect predictions to the server. The server may transmit the corrections to reviewers at reviewer computing devices, whom may provide inputs as to whether they believe the corrections are accurate. The server may generate a training set with the corrections that meet a selection criteria based on the reviewer inputs and the image. The server may apply the training set to the machine learning model that made the initial prediction to improve the training of the model to avoid making similar contouring errors for future images. The server may repeat this process for each contoured image in which a radiotherapy clinic has identified a contouring error. Thus, the systems and methods described herein provide for a method of continuously training a machine learning model to contour organs from an image using a crowdsourced curated training data set, improving upon the accuracy and efficiency of previous methods of training a machine learning model in a production environment. FIG. 1 is a non-limiting example of components of a system in which the analytics server operates.

FIG. 1 illustrates components of an organ contouring segmentation system 100, according to an embodiment. The system 100 may include an analytics server 110a, system database 110b, electronic data sources 120a-d (collectively electronic data sources 120), end-user devices 140a-c (collectively end-user devices 140), an administrator computing device 150, and a medical device 160 having a medical device computer 162. The system 100 may also include a correction computing device 170 and reviewer computing devices 180a-c (collectively reviewer computing devices 180). Various components depicted in FIG. 1 may belong (e.g., physically located at) to a radiotherapy clinic at which patients may receive radiotherapy treatment, in some cases via one or more radiotherapy machines located within the clinic (e.g., medical device 160). The above-mentioned components may be connected to each other through a network 130. Examples of the network 130 may include, but are not limited to, private or public LAN, WLAN, MAN, WAN, and the Internet. The network 130 may include wired and/or wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), EDGE (Enhanced Data for Global Evolution) network.

The system 100 is not confined to the components described herein and may include additional or other components, not shown for brevity, which are to be considered within the scope of the embodiments described herein.

The analytics server 110*a* may store one or more machine learning models 111. The machine learning models 111 may be any machine learning model such as a neural network, a random forest, a clustering machine learning model, a support vector machine, a regression model, etc. The machine learning models 111 may be configured to receive images such as CT scans of individuals and output predicted organ labels for the pixels of the images. The outputs may be probabilities for different organ labels (e.g., lung, pancreas, heart, gallbladder, etc.) for individual pixels that the pixels may depict or represent. For each pixel, the machine learning models 111 (or the analytics server 110*a*) may select the organ label with the highest probability as the correct organ label prediction at the output for the pixel.

In some cases, the machine learning models 111 may correspond to particular radiotherapy clinics. For example, each of the machine learning models 111 may be trained based solely on training data generated at a particular clinic or may be trained to an accuracy threshold based on data from multiple clinics and then trained based on training data specific to a particular clinic. In some cases, the analytics server 110*a* may only provision or grant the radiotherapy clinics access to the machine learning models 111 for which the machine learning models 111 were trained. In some cases, the machine learning models 111 may be distributed or transmitted to the various radiotherapy clinics such as after the analytics server 110*a* determines the machine learning models 111 are accurate to an accuracy threshold.

The analytics server 110*a* may generate and display an electronic platform configured to use various computer models (including artificial intelligence and/or machine learning models) to contour images with labels indicating the organs that different pixels of the image represent or depict. The electronic platform may include graphical user interfaces (GUI) displayed on each electronic data source 120, the end-user devices 140, and/or the administrator computing device 150. An example of the electronic platform generated and hosted by the analytics server 110*a* may be a web-based application or a website configured to be displayed on different electronic devices, such as mobile devices, tablets, personal computers, and the like. In a non-limiting example, a physician operating the physician device 120*b* may upload an image (e.g., a CT scan or another scan) to the analytics server 110*a* via the electronic platform that is hosted by the analytics server 110*a*. The analytics server 110*a* may execute the machine learning model 111 using the image as an input and output predicted organ labels for individual pixels of the image. The analytics server 110*a* may then use the systems and methods described herein to communicate with the correction computing device 170 and the reviewer computing devices 180 to train the machine learning model 111 based on the predicted organ labels.

The analytics server 110*a* may be any computing device comprising a processor and non-transitory machine-readable storage capable of executing the various tasks and processes described herein. Non-limiting examples of such computing devices may include workstation computers, laptop computers, server computers, and the like. While the system 100 includes a single analytics server 110*a*, the analytics server 110*a* may include any number of computing devices operating in a distributed computing environment, such as a cloud environment.

The analytics server 110*a* may execute software applications configured to display the electronic platform (e.g., host a website), which may generate and serve various webpages to each electronic data source 120 and/or end-user devices 140. Different users may use the website to view and/or interact with predicted results from the machine learning models 111.

The analytics server 110*a* may be configured to require user authentication based upon a set of user authorization credentials (e.g., username, password, biometrics, cryptographic certificate, and the like). The analytics server 110*a* may access the system database 110*b* configured to store user credentials, which the analytics server 110*a* may be configured to reference in order to determine whether a set of entered credentials (purportedly authenticating the user) match an appropriate set of credentials that identify and authenticate the user.

The analytics server 110*a* may also store data associated with each user operating one or more electronic data sources 120 and/or end-user devices 140. The analytics server 110*a* may use the data to weigh interactions while training various AI models accordingly. For instance, the analytics server 110*a* may indicate that a user is a medical professional whose inputs may be monitored and used to train the machine learning or other computer models described herein.

The analytics server 110*a* may generate and host webpages based upon a particular user's role within the system 100. In such implementations, the user's role may be defined by data fields and input fields in user records stored in the system database 110*b*. The analytics server 110*a* may authenticate the user and may identify the user's role by executing an access directory protocol (e.g. LDAP). The analytics server 110*a* may generate webpage content that is customized according to the user's role defined by the user record in the system database 110*b*.

For example, different users may have different permissions based on whether they are considered "correctors" that can input corrections for the outputs of the machine learning model 111. Users may also be "reviewers" that collaborate to determine which of the corrections are accurate and can be used to train the machine learning model 111. The website may include different user interfaces that enable the users to perform their designated tasks based on their role.

The correctors and the reviewers may access the system hosted by the analytics server 110*a* via the correction computing device 170 and the reviewer computing devices 180, respectively. The correction computing devices may be similar to or the same as the end-user device 120 but may be accessed by a person designated as a corrector within the system database 110*b*. The reviewer computing devices 180 may be similar to or the same as the end-user devices 120, but may be accessed by a person designated as a reviewer within the system database 110b. In some instances, the correction computing device 170 and the reviewer computing devices 180 may be operated by individuals at radiotherapy clinics or that are otherwise associated with (e.g., employed by or contracted with) such clinics.

The analytics server 110a may receive patient data (e.g., medical images, height, weight, diagnosis, age, equipment, etc.) and images such as CT scans from a user or retrieve such data from a data repository, analyze the data, and display the results on the electronic platform. For instance, in a non-limiting example, the analytics server 110a may query and retrieve medical images from the database 120d. The analytics server 110a may execute various machine learning models 111 (stored within the system database of the clinic server 140b or the analytics server 110b) to analyze the retrieved data. The analytics server 110a may then display the results to be interacted with via the electronic platform on the administrator computing device 150, the medical professional device 120b, the medical computing device 162, and/or the end-user devices 140.

The electronic data sources 120 may represent various electronic data sources that contain, retrieve, and/or input data associated with a patient's treatment plan including patient data and treatment data. For instance, the analytics server 110a may use the clinic computer 120a, medical professional device 120b, the server 120c (associated with a physician and/or clinic), and database 120d (associated with the physician and/or the clinic) to retrieve/receive data associated with a patient's treatment plan.

End-user devices 140 may be any computing device comprising a processor and a non-transitory machine-readable storage medium capable of performing the various tasks and processes described herein. Non-limiting examples of an end-user device 140 may be a workstation computer, laptop computer, tablet computer, and server computer. In operation, various users may use end-user devices 140 to access the GUI operationally managed by the analytics server 110a. Specifically, the end-user devices 140 may include clinic computer 140a, clinic server 140b, and a medical device professional 140c. Even though referred to herein as "end-user" devices, these devices may not always be operated by end-users. For instance, the clinic server 140b may not be directly used by an end-user. However, the results stored onto the clinic server 140b may be used to populate various GUIs accessed by an end-user via the medical professional device 140c.

The administrator computing device 150 may represent a computing device operated by a system administrator. The administrator computing device 150, along with the medical professional device 140c, medical professional device 120b, medical device computer 162, and the like, may be configured to display organ contours generated by the analytics server 110a (e.g., various analytic metrics determined during training of one or more machine learning models and/or systems); monitor various machine learning models 111 used by the analytics server 110a, electronic data sources 120, and/or end-user devices 140; review feedback; and/or facilitate training or retraining (calibration) of the machine learning models 111.

The medical device 160 may be a radiotherapy machine (e.g., a linear accelerator, particle accelerator (including circular accelerators), or a cobalt machine)) configured to implement a patient's radiotherapy treatment. The medical device 160 may also include an imaging device capable of emitting radiation such that the medical device 160 may perform imaging according to various methods to accurately image the internal structure of a patient. For instance, the medical device 160 may include a rotating system (e.g., a static or rotating multi-view system). A non-limiting example of a multi-view system may include stereo systems (e.g., two systems may be arranged orthogonally). The medical device 160 may also be in communication with a medical device computer 162 that is configured to display various GUIs discussed herein. For instance, the analytics server 110a may display the results predicted by the machine learning model 111 onto the medical device computer 162.

In operation, a physician may access an application executing on the physician device 120b and input RTTP data (e.g., patient information, patient diagnosis, radiation therapy treatment attributes, etc.). The analytics server 110a may use a patient identifier to query patient data (e.g., patient anatomy and/or medical images) from the electronic data sources 120. The analytics server 110a may then utilize the systems and methods described herein to contour the medical images from the patient data, generate configuration data to control the medical device 160 based on the contoured medical images, and generate an optimized/uniform RTTP and display the results onto the physician device 120b, the clinic computer 140a, and/or the medical device computer 162.

As described herein, treatment attributes may be or include any attributes related to treating patients at a radiotherapy clinic and/or using a radiotherapy machine. Treatment attributes may include, but are not limited to, different treatment modalities, field geometry settings for external beam radiotherapy, side effect predictions, organ and/or tumor segmentation, machine therapy attributes, dosage administration attributes (e.g., dosage amount), treatment frequency, treatment timing, etc.

In one example, the analytics server 110a may be in communication (real-time or near real-time) with the medical device 160. A server/computer hosting the medical device 160 can adjust the medical device 160 based on contoured images that the analytics server 110a either receives from an external source or that the analytics server 110a contours itself using the machine learning models 111 stored in memory of the analytics server 110a. For instance, the analytics server 110a may execute a machine learning model 111 to contour an image to indicate the locations of different organs of a person that is currently receiving radiotherapy treatment. The analytics server 110a may identify the locations of the organs from the image and transmit instructions to the medical device 160 to indicate how to operate the gantry and other field geometry settings for the medical device 160 to use to provide radiotherapy treatment to the individual at the target region. The analytics server 110a may transmit instructions to the medical device 160 indicating any number or type of treatment attributes (e.g., field geometry settings) to facilitate such treatment based on the contoured image. In some cases, the analytics server 110a may transmit contoured images to the medical device 160 and the medical device 160 may generate field geometry settings to treat the corresponding patient using intrinsic processes.

In a non-limiting example, the analytics server 110a may train the machine learning model using a collaborative method. To do so, the analytics server 110a may retrieve one of the machine learning models 111 and an image of an individual (e.g., a CT scan, a PET scan, etc.) from the database 110b or from an end-user device 120. The analytics server 110a may execute the machine learning model 111 using the image as an input to contour the image with predicted labels for the individual pixels of the images. The predicted labels may identify various organs and/or empty space depicted within the image. The analytics server 110a may transmit the predictions to the correction device 170. The correction device 170 may receive one or more inputs from a designated corrector identifying incorrect prediction labels for the image. The correction device 170 may generate image fragments as vectors with values indicating the corrections and transmit the image fragments to the analytics server 110a. The analytics server 110a may then forward or transmit the image fragments to one or more of the reviewer computing devices 180. The reviewer computing devices 180 may receive inputs from reviewers indicating whether the corrections in the image fragments are correct. The reviewer computing devices 180 may transmit the inputs to the analytics server 110a, which may evaluate the inputs according to a selection criteria (e.g., a threshold) to determine which fragments satisfy the criteria. The analytics server 110a may add any image fragments that satisfy the selection criteria to a training data set. The analytics server 110a may also add the image to the training data set. The analytics server 110a may input the training data set to the machine learning model 111 for supervised training.

Figure 2:
FIG. 2 illustrates a flow diagram of a process executed in an organ contouring segmentation system, according to an embodiment.

FIG. 2 illustrates a flow diagram of a process executed in an organ contouring segmentation system, according to an embodiment. The method 200 may include steps 202-210. However, other embodiments may include additional or alternative steps, or may omit one or more steps altogether. The method 200 is described as being executed by a data processing system (e.g., a computer similar to the analytics server 110a, the data source 120, or the end-user device 140 described in FIG. 1). However, one or more steps of method 200 may be executed by any number of computing devices operating in the distributed computing system described in FIG. 1. For instance, one or more computing devices may locally perform part or all of the steps described in FIG. 2 or a cloud device may perform such steps.

In step 202, the data processing system may execute a machine learning model using an image to output at least one organ label for a plurality of pixels of the image. The image may be a two-dimensional or a three-dimensional image and may include pixels or voxels, respectively. As described herein, each reference to a pixel may be a reference to a voxel in cases in which the relevant image is a three-dimensional image. The image may be a CT or a PET scan of an individual that is receiving radiotherapy treatment at one or more radiation therapy clinics. The image may depict the organs and/or bone structure of the individual and may be raw images that have not been contoured or previously labeled.

The data processing system may execute the machine learning model using the received image from a radiotherapy clinic. In one example, the data processing system may receive the image responsive to an individual (e.g., a technician or a doctor) uploading the image to a database of the data processing system. For instance, the physician may capture a CT scan (e.g., using a CT scanner at a radiotherapy clinic) and upload the scan to the data processing system. The physician may upload the scan manually through a user selection at a user interface or the scanner may automatically upload the image.

The data processing system may receive the image and apply the image to a machine learning model to contour the image. For example, the data processing system may generate a feature vector for the image that contains various information about the characteristics of each pixel, such as color, hue, location within the image, etc. The data processing system may then input the feature vector into the machine learning model and execute the machine learning model. The machine learning model may output predicted contouring or organ labels that indicate the organ that each respective pixel likely depicts or represents. The data processing system may retrieve the output from the machine learning model and generate a contoured image with outlines around the different organs of the image based on the labels. The data processing system may generate the contoured image to include annotations or labels that indicate the organs that are outlined.

After obtaining the organ labels or the outlined image, the data processing system may transmit the organ labels, the raw image, and/or the outlined image to the radiotherapy clinic.

In step 204, the data processing system may determine that the at least one predicted organ label requires a correction. The data processing system may do so after receiving a signal from the radiotherapy clinic indicating that the predicted organ labels for the image have at least one error. For example, the data processing system may transmit the predicted organ labels (e.g., the contoured image) to the radiotherapy clinic. A physician at the radiotherapy clinic may review the predicted organ labels on a user interface and identify errors in the predicted organ labels. The physician may mark (e.g., with a slash, a circle, a box, a scribble, etc.) any labels or outlines on the image that the physician deems to be an error. The physician may then send the marked-up image back to the data processing system. The data processing system may receive the marked-up image and determine there is an error in the image in response to receiving the marked-up image.

The data processing system may transmit the marked-up image and/or the raw image to a correction computing device in response to receiving the marked-up image and/or determining the image requires correction. The correction computing device may be a computing device that is physically located on the premises of a radiotherapy clinic or may be an off-site computing device. The correction computing device may be operated by a "corrector" that is tasked with reviewing the identified errors in the predictions and/or predicted labels and/or outlined image to identify any errors in the labels or outlined image. For example, the correction computing device may display the predictions from the machine learning model or the outlined image on a user interface as an overlay to the image or next to the image. The correction computing device may locally store and transmit information regarding the correction, which may include visual data (e.g., a drawn contour, a revised contour, a selection of a region, identification of a region, selection of a contour), labeling data (e.g., a new or revised label, including alphanumeric characters and a location in the image), or the like.

The corrector may view the user interface and interact with the user interface to select areas that were labeled improperly (e.g., labeled as the incorrect organ or incorrectly labeled as empty space) or to label areas that do not have a label. The corrector may input corrections to the improper labels at the user interface of the correction computing device. In instances in which the correction computing device receives a marked-up image, the corrector may view the marked-up image and provide inputs that indicate whether the marks are correct and/or annotations to the marks to indicate the correct labels or outlines for the image. The correction computing device may receive the corrections and generate image fragments as vectors with values indicating the corrections to the improper labels. The correction computing device may then transmit the image fragments and, in some cases, the image back to the data processing system for further processing.

The corrector may view the user interface and interact with the user interface to select and revise an outline of a predicted (or contoured) organ or other object. The correction may include a revision, change, amendment, adjustment, removal, or erasure of a portion or all of the outline. The correction may be represented by a flag or identification of an aspect or feature that is incorrect. For example, a corrector can draw a circle around an incorrect contour line of an organ.

In step 206, the data processing system may receive the image fragments and/or the image from the correction computing device. The data processing system may process the image fragments and transmit the image fragments to one or more reviewer computing devices. In some cases, the data processing system may also transmit the image to the reviewer computing devices in the same or a different message. The reviewer computing devices may each be a computing device that is physically located on the premises of a radiotherapy clinic or at an off-site computing device. The reviewer computing devices may be operated by "reviewers" that are each tasked to review the image fragments generated by the correction computing device and provide inputs that indicate whether the reviewer believes the corrections are correct. The reviewer computing devices may each present or display the corrections or image fragments to the reviewers at a user interface as overlays to the image or next to the image such that the reviewer may determine if the corrections are accurate. Via the user interface, each reviewer may view each image fragment (or correction) and input an indication (e.g., a binary indication) indicating whether the reviewer believes the image fragment contains a correct correction. The reviewer computing devices may receive the inputs from the user interface and transmit the inputs to the data processing system.

In step 208, the data processing system may receive the inputs indicating whether the image fragments are correct from the reviewer computing devices. Upon receiving the inputs, the data processing system may determine whether the inputs for each of the image fragments satisfy a selection criteria and can be used to train the machine learning model. In one example, the selection criteria may include a rule and threshold indicating that an image fragment may be used to train the machine learning model if enough reviewer computing devices provided an input indicating the image fragment includes a correct correction to exceed or otherwise satisfy the threshold.

In another example, the selection criteria may include a rule that allocates weights to different reviewer computing devices or reviewer user accounts that indicate the impact the inputs by the different reviewer computing devices or reviewer user accounts have in determining whether to use the image fragments to train the machine learning model. Such weights may be manually assigned or the data processing system may determine the weights for each reviewer computing device or reviewer user account based on the number of image fragments and/or images for which the reviewer computing device or reviewer user account has provided inputs (e.g., reviewer computing devices or reviewer user accounts that have provided inputs for more image fragments or images may have a higher weight than reviewer computing devices or reviewer user accounts that have provided inputs for fewer image fragments or images). The data processing system may separately aggregate the weighted inputs for the different image fragments that indicate the respective image fragment contains a correct correction. The data processing system may compare the aggregated weighted inputs to a threshold and determine any image fragments with an aggregated weighted input that exceeds or satisfies the threshold may be used to train the machine learning model. Thus, the generation of the training data set may be governed by more experienced reviewers while still allowing newer reviewers to provide inputs, causing the training data set to be more accurate.

In step 210, the data processing system may aggregate image fragments that satisfy the selection criteria (e.g., exceed or satisfy a threshold) into a training data set. For instance, the data processing system may generate and maintain a counter for each image fragment that the data processing system receives from the correction computing device. The counter may indicate the number of reviewer computing devices or reviewer user accounts that have indicated the image fragment contains a correct correction. The data processing may receive the inputs from the reviewer computing devices or reviewer user accounts and, for each image fragment, increment the respective counter for each input that indicates the image fragment contains a correct correction. In cases in which the data processing uses a weighted criteria to determine whether to use fragments for training, the data processing system may multiply the different inputs by the weight of the reviewer computing device or reviewer user account that provided the input and then increment the counter by adding the weighted input to the counter. The data processing system may similarly maintain and increment counters for each image fragment.

The data processing system may add any image fragments that satisfy a selection criteria to a training data set. For example, the data processing system may compare the counters for each of the image fragments to a threshold of the selection criteria and identify the image fragments with counters that exceed the threshold as satisfying the selection criteria. In another example, in cases in which the selection criteria contains a rule that an image fragment can be added to a training data set if select reviewers have indicated the image fragment contains a correct correction, the data processing system may identify identifications of the reviewer computing devices or reviewer user accounts that have provided inputs indicating the respective image fragments were correct and compare the identifications to the selection criteria. The data processing system may determine the selection criteria is met if the reviewers indicated in the selection criteria have provided inputs indicating the image fragment has a correct correction. In another example, the selection criteria may include a combination of identifications of reviewer computing devices that must approve an image fragment and a number of reviewer computing devices that have approved the image fragment must exceed a threshold. For an image fragment, the data processing system may compare the identifications of the reviewer computing devices that approved the image fragment and the count of the number of reviewer computing devices that approved the image to the threshold and determine the selection criteria is met only if both of the conditions in the criteria are satisfied.

To add the image fragments to a training data set, the data processing system may concatenate the values of the image fragments (e.g., values of the vector of the image fragment) that satisfy a selection criteria. For instance, the data processing system may identify the image fragments that satisfy the selection criteria. The data processing system may then concatenate the values of the identified image fragments into a single label vector. In some cases, the data processing system may concatenate the image fragments together by adding the values of the image fragments to index values of the label vector that correspond to the image fragment's position within the image. The data processing system may add null values to any index values of the label vector for which there is not a validated image fragment because the values either were not reviewed by any reviewers or were improperly corrected by the corrector and may not be accurate. The index values of the label vector may have a one-to-one correspondence with a feature vector that contains values that represent the image (e.g., each index value of the label vector may correspond to the same pixel of the image as the index value of the feature vector). In some cases, the data processing system may mask the corrected area of the feature vector (e.g., the data processing system may create a mask as an array that has the same size as the image with values of one on the portions of the image that were corrected and values of zero at the other locations). Thus, the data processing system may generate a training data set that only includes targeted corrections to the machine learning model's output and avoids including any non-corrected portion that may cause a "confirmation bias" or may be wrong and not corrected, which may be a result of being far from the target organ of an RTTP.

In instances in which the data processing system determines one or more of the image fragments do not satisfy the selection criteria (e.g., the number of reviewers that approved the image fragment's correction does not satisfy the threshold or the required reviewers did not approve the image fragment), the data processing system may discard the image fragments. To do so, the data processing system may delete the image fragments from memory or otherwise refrain from including the image fragments in the label vector. In such cases, the data processing system may transmit a message back to the correction computing device indicating the image fragments that did not satisfy the selection criteria and/or were not included in the label vector. Advantageously, by discarding the image fragments that did not satisfy the selection criteria, the data processing system may avoid including incorrect or inaccurate data in the training data set, therefore improving the quality and efficiency of the training machine learning model.

At step 212, the data processing system may train the machine learning model with the generated training data set. To do so, the data processing system may feed the training data set including the label vector and the feature vector for the image into the machine learning model. The label vector may be the labels for the correct predictions for the respective pixels of the image and the feature vector may be the values for the pixels of the image. The data processing system may execute the machine learning model using the feature vector for the image. The data processing system may then compare the outputs of the machine learning model indicating organ labels for different pixels with the corresponding values of the label vector. The data processing system may compare the values and use a loss function or another supervised training technique to train the machine learning model. The data processing system may use backpropagation to determine a gradient for the respective loss function and update the weights and/or parameters of the machine learning model using the gradient, such as by using gradient descent techniques.

In some instances, the data processing system may train the machine learning model upon determining the number of image fragments that have been aggregated into the training data set exceeds a training threshold. For instance, the data processing system may maintain a counter indicating the number of image fragments that have been added to the label vector for the image. The data processing system may increment the counter each time the data processing system identifies an image fragment that satisfies the selection criteria. After each increment, the data processing system may compare the count of the counter to the training threshold and determine if the count exceeds the threshold. Responsive to the count exceeding the threshold, the data processing system may stop identifying image fragments that satisfy the selection criteria. The data processing system may then input the label vector in its current state and the corresponding feature vector for the image into the machine learning model for supervised training. By using the training threshold, the data processing system may avoid diminishing returns to the processing costs of evaluating the inputs received from the reviewer computing devices. The data processing system may also avoid creating training data that is too nuanced to the image and may result in overtraining.

Upon being trained by the training data set for the image, the data processing system may determine an accuracy for the machine learning model by feeding the machine learning model a pre-contoured image (e.g., a labeled image). The data processing system may determine the accuracy of the machine learning model in predicting labels for the image by comparing the output prediction labels to the ground truth labels for the image and compare the accuracy to an accuracy threshold. The data processing system may iteratively feed the machine learning model training images until determining the model is accurate to the accuracy threshold, at which point the data processing system may provision (e.g., make available to an external computing device to access or transmit to the computing devices at a particular clinic) the machine learning model in real-time to contour images for RTTP planning. In some cases, the data processing system may determine the accuracy of the machine learning by comparing the output of the machine learning model based on the training dataset with the corresponding labels.

For example, after training a machine learning model to an accuracy threshold, the data processing system may receive an image (e.g., a two-dimensional image or a three-dimensional image or model) of a scan of a person from a clinic computing device that operates at or for a radiotherapy clinic. The image may not be contoured or labeled. The data processing system may feed the image (e.g., feed characteristics of individual pixels of the image) into the machine learning model and execute the model to obtain an output of predicted labels for the individual pixels of the image. The data processing system may recreate the image in a record by drawing an outline of the different organs in the image or generating a contoured image according to the assigned labels. The data processing system may transmit the contoured image and/or the predicted labels for the pixels back to the clinic computer. In turn, the clinic computer may display the predicted labels on a user interface and/or use the predicted labels to control a radiotherapy machine for radiotherapy treatment. In some instances, the data processing system itself may control or adjust the settings of the radiotherapy machine to provide treatment to a patient.

In some instances, the data processing system may implement a reward scheme to provide incentives for the reviewers and/or correctors to participate in the method 200. The reviewers and correctors may often be the individuals at radiotherapy clinics that have other roles in their current position with the clinic than reviewing contouring data to improve the accuracy of machine learning models. Accordingly, the reviewers and correctors may need an incentive to add these tasks to their job requirements. The data processing system may provide such incentives with a reward scheme that offers various rewards to the reviewers and/or correctors based on the number of images or image fragments the reviewers and/or correctors have reviewed or corrected.

For instance, the data processing system may provide a corrector with a credit for each image fragment the corrector produces and transmits to the data processing system or for each image for which the corrector performs corrections. For each corrector (e.g., corrector user account or correction computing device), the data processing system may maintain one or more counters indicating the number of image fragments the corrector has produced and/or the number of images for which the corrector has performed corrections. The data processing system may increment the counter for each image fragment the data processing system receives from the corrector. For each increment, the data processing system may transmit a credit to the correction computing device indicating the contribution from the corrector. In some cases, the data processing system may transmit a credit only or additionally after correcting a threshold number of images or generating a threshold number of image fragments. Such a credit may be used by the clinic at which the corrector is located (e.g., by any computing devices within the clinic), such as to provide the corrector with access to the data processing system in a software-as-a-service environment for a reduced cost or for a number of uses that correspond to the credit. In some instances, the data processing system may store the credit in its own memory such that the data processing system may identify the credit from memory when the correction computing device or another computing device associated with the clinic at which the correction computing device is located requests for an image to be contoured. Otherwise, a computing device located at the correction device's clinic may transmit the credit back to the data processing system when requesting for an image to be contoured. In either case, the data processing system may identify the credit and execute the machine learning model based on the credit without requiring any further values from the requesting computing device.

In some instances, the correction computing device or the correction user account may be issued credits based on how accurate they have been with its corrections. For instance, the data processing system may assign more credits to the correction user device or correction user account for the image fragments that were deemed accurate and used to train the machine learning model than for corrections that were discarded or not used. In some instances, the data processing system may assign more credits to the correction computing device or the correction user account based on the number of image fragments that were used for training from an entire image.

The data processing system may similarly provide credits to the reviewer computing devices or reviewer user accounts based on the number of images for which a corresponding reviewer has reviewed image fragments or the number of image fragments the reviewer has reviewed. For instance, the data processing system may store or transmit credits to a reviewer computing device or reviewer user account for each input the data processing system receives from the reviewer computing device or reviewer user account. In some cases, the data processing system may increment a counter for each input or image and store and/or transmit such credits to the reviewer computing device or reviewer user account in response to the count of the counter exceeding a threshold. Because the reviewer computing devices may be located or associated with a particular radiotherapy clinic, the credit may be used by the clinic at which the reviewer is located in a similar manner to how the correction computing devices may use the credits. For example, the reviewer computing device or a computing device at the same clinic may transmit the credit and an image to the data processing system, which can then contour the image with the machine learning model in response to identifying the credit. In another example, the data processing system may retrieve the credit upon receiving a contouring request from the reviewing computing device or other computing device at the clinic. Thus, the data processing system may provide incentives to various radiotherapy clinics to participate in the collaborative machine learning process described herein.

In some instances, the reviewer computing devices or the reviewer user accounts may be issued credits based on how accurate they are with their inputs. For instance, for each image fragment, the data processing system may compare the inputs of the different reviewers and determine which of the inputs is in the majority. The data processing system may assign credits to the reviewer user accounts or reviewer computing devices for individual fragments based on whether the reviewer is in the majority (e.g., the data processing system may assign more credits for inputs for which the reviewer is in the majority because such inputs may be more accurate), thus rewarding the reviewers for their accuracy.

It should be noted that, in addition to organ segmentation and contouring, the systems and methods described herein may be used to train machine learning models to make other predictions. For instance, the systems and methods described herein may be used to train a machine learning model to predict treatment attributes for RTTP planning. For instance, the data processing system may receive patient data about a patient (in some cases including a contoured image of the patient that is generated by another machine learning model trained as described herein) and predict one or treatment attributes for a physician and/or radiotherapy machine to use to treat a patient. The data processing system may execute a machine learning model using the patient data for the patient and output various predicted treatment attributes. The data processing system may transmit the predicted treatment attributes to a correction computing device and receive corrections to any of the predicted treatment attributes that were determined by a corrector operating the correction computing device. The data processing system may then transmit the corrections to one or more reviewer computing devices to review the corrections and provide inputs indicating whether they agree with the corrections. The data processing may receive the inputs and determine which of the corrections satisfy a selection criteria (e.g., have enough inputs indicating the correction was correct to exceed a threshold or any other criteria, such as the criteria described herein). The data processing system may generate a label vector from the corrections that satisfy the criteria and input the label vector and the patient data for the patient into the machine learning model for supervised training. In some cases, the data processing system may control a radiotherapy machine using the output attributes to provide radiotherapy treatment for the patient for which the machine learning model made the prediction. The processing system may similarly perform this process to incrementally train a machine learning model to make any type of prediction.

Figure 3:
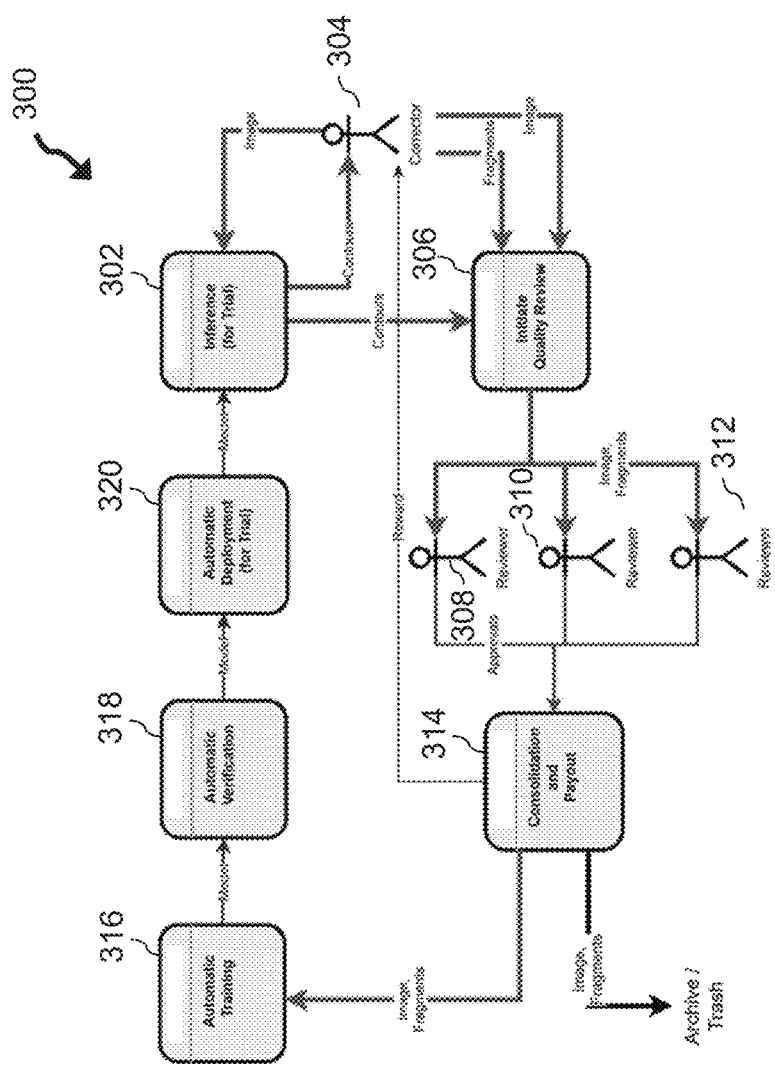
FIG. 3 illustrates a sequence diagram of training a machine learning model for organ segmentation, according to an embodiment.

FIG. 3 illustrates a sequence diagram 300 of training a machine learning model for organ segmentation, according to an embodiment. The sequence diagram 300 includes multiple steps or processes that may be performed by a data processing system (e.g., analytics server 110a) and remote computing devices such as correction computing device 170 and reviewing computing devices 180. The remote computing devices may be physically located at radiotherapy clinics or may be operated by users that are associated with such radiotherapy clinics. The sequence diagram 300 may include any number of steps and the steps may be performed in any order.

In process 302, the data processing system may receive an image from a radiotherapy clinic or from another data source and execute a machine learning model using the image to contour the image. The image may be a scan (e.g., a CT scan) of an individual. Execution of the machine learning model with the image may cause the machine learning model to output organ labels for individual pixels of the image indicating predictions of the organs the pixels represent or depict (e.g., a lung, heart, gallbladder, etc.). The data processing system may extract the labels from the output of the machine learning model and transmit the predicted labels and, in some cases, the image, to a correction computing device, which may be operated by a corrector 304.

The corrector 304 may view the outputs on a user interface and provide inputs to the user interface indicating the incorrect predictions. The corrector 304 may also input what the corrector 304 believes to be the correct predictions at the user interface such as by typing the correct labels or selecting the correct labels from a drop-down list that includes identifications of different organs. In some instances, the corrector 304 may manually label the correct outline for different organs using contouring software (e.g., GRATIS, PLUNC, PRISM, etc.). The correction computing device may receive the inputs and create image fragments which may be vectors with values that identify the corrections to the predicted labels. The correction computing device may transmit the image fragments to the data processing system, in some cases with the image.

In process 306, the data processing system may initiate a quality review process for the corrections to the machine learning model's outputs. The data processing system may transmit the image fragments to the reviewer computing devices of reviewers 308, 310, and 312 with the image. The reviewers 308, 310, and 312 may review the image fragments as overlays to the image or next to the image on a user interface. The reviewers 308, 310, and 312 may provide inputs indicating whether they agree with the corrections of the fragments to their respective reviewer computing devices. The reviewer computing devices may then transmit the inputs back to the data processing system.

In process 314, the data processing system may generate a label vector from the image fragments that satisfy a selection criteria. For example, the data processing system may identify each image fragment for the image for which at least a threshold number of reviewer computing devices transmitted a reviewer input indicating the respective reviewer agreed with the correction of the fragment. The data processing system may concatenate the values of the vectors for each image fragment that satisfy the selection criteria into a label vector and discard or archive any image fragments that do not satisfy the criteria. The data processing system may then transmit credits to the corrector 304 and/or reviewers 308, 310, and 312 and/or train the machine learning model using the image and the concatenated label vector as an input in process 316.

After training the machine learning model, in process 318, the data processing system may determine the accuracy of the output of the machine learning model based on the training data. For instance, the data processing system may identify the output of the machine learning model and compare the output to the label vector generated from the image fragments. The data processing system may determine the accuracy to be a percentage of the predictions that were correct or a combination of the probabilities that were output from the machine learning model for individual pixels compared with the correct output. The data processing system may verify whether the machine learning model is sufficiently trained based on whether the accuracy exceeds an accuracy threshold. If the accuracy does not exceed the accuracy threshold, the data processing system may determine the machine learning model is not sufficiently trained is not ready for real-world use. However, if the machine learning model is sufficiently trained, in process 320, the data processing system may adjust a setting of the machine learning model such that a remote device at a clinic may access the machine learning model for contouring.

In a non-limiting example, the systems and methods described herein may be used in a production environment to continuously train a machine learning model that has already been deployed for image contouring. For instance, a processing system may host a platform that can be accessed by employees at different radiotherapy clinics. Via the platform, an employee may upload images to the data processing system that the data processing system may contour using a machine learning model. The data processing system may send the contoured image back to the employee. The employee may review the image to confirm the accuracy of the contouring. The employee may identify some areas of the contoured image that were contoured incorrectly and write "scribbles" on the contoured image on the inaccurate areas to indicate the locations of the incorrect contours. The employee may then send the marked-up image to the data processing system to indicate there were errors in the contoured image.

The data processing system may receive the marked-up image and send the marked-up image to various people at other radiotherapy clinics that have been assigned to a "corrector" role. The correctors may receive the marked-up image and review the scribbles to see if they agree with the markings in the image. The correctors may ignore any corrections that they disagree with and draft corrections for the scribbled portions that the correctors agree identify errors in the contoured image. The correctors may create image fragments that contain corrections to the errors. The correctors may then send the image fragments back to the data processing system.

The data processing system may receive the image fragments containing the fragments and send the image fragments to people at radiotherapy clinics that have been assigned to a "reviewer" role. The reviewers may each review the corrections in the image fragments and determine if they agree with the corrections. The reviewers may vote on whether they agree with the corrections (e.g., provide upvotes or downvotes for the corrections). The data processing system may count the votes for the image fragments. The data processing system may identify the image fragments that have a number of positive votes that exceed a threshold (e.g., 50%) and add such image fragments to a training data set containing the image. The data processing system may discard (e.g., move to a "logged issues" database that is not used for model training) any image fragments that do not have enough votes to exceed the threshold. Accordingly, only image fragments with enough votes to exceed the threshold can be used to train the machine learning model. The data processing may then input the feature vector into the machine learning model to train the machine learning model.

In some cases, the reviewer's votes may be weighted according to their individual trust scores. In such cases, the data processing system may compare the weighted votes to a threshold instead of comparing the raw votes themselves. For example, as reviewers review corrections, the reviewers may gain higher trust scores that cause their votes to hold more weight. The reviewers may increase their trust score for each image fragment that they review and/or for each image fragment for which they agree with the majority. Accordingly, the more experienced reviewers may have more weight with their votes than less experienced reviewers because the more experienced reviewers are likely to be more accurate, thus providing a further method of ensuring the machine learning model is trained using accurate corrected training data.

The aforementioned process may be a continuous process in which multiple radiotherapy clinics request image contours and provide feedback identifying the errors in the contours. Each time a clinic identifies a contoured image with at least one error, the clinic may send a marked-up version of the image to the data processing system to initiate the crowdsourcing feedback process. The data processing system may generate a training data set from errors after they have been corrected and reviewed. The data processing system may then use regression testing to confirm the training improved the accuracy of the model and redeploy the model after confirming the training improved the model's accuracy. The data processing system may repeatedly train the machine learning model using such training data sets over time to gradually increase its accuracy. Accordingly, the data processing system may train the machine learning model in a semi-automatic continuous loop while avoiding any time-consuming and expensive processes that typically require internal and external verification of candidate training data.

In one non-limiting example, the process may involve using reviewers to validate the training of a production model. For instance, the data processing system may validate a trained candidate machine learning model by proving the candidate machine learning model has improved on a specific issue while showing non-regression in the other areas (e.g., other contouring predictions) with respect to the current production model (e.g., the untrained version of the candidate machine learning model). To do so, the data processing system may assign a task that involves evaluating a set of organs of two sets of CT images (e.g., a nominal set for non-regression and an issues set to check for improvements). A reviewer may assign a score for each organ of the sets. The data processing may execute each machine learning model using the sets of images and a reviewer may review the outputs to determine whether the machine learning models provided correct outputs. The data processing system may compare the accuracy and/or aggregate score for each machine learning model and only validate the candidate machine learning model if the candidate machine learning model has a higher accuracy or score than the current production model. Otherwise, the data processing system may reject the candidate machine learning model and continue to use the current production model in production.

In some cases, the aforementioned process may include rewarding the reviewers and the correctors that participate in the process. The process may include a rewarding process because the reviewers and correctors may have other jobs at their respective clinics and there may not be any incentive for the clinics to require their employees to participate in training the machine learning model. Accordingly, the data processing system may automatically reward the correctors and the reviewers with credits based on how often they participate in reviewing contoured images and/or the quality of their review. The credits may enable the radiotherapy clinics participating in the crowdsourcing training to use the trained machine learning model for a predetermined number of uses or for a predetermined time period. The data processing system may issue such credits, for example, when a corrector's corrections receive a high positive consensus and/or when reviewers vote with the consensus for individual image fragments.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method for training a machine learning model for automatic organ segmentation, comprising:
    executing, by a processor, a machine learning model using an image to output at least one predicted organ label for a plurality of pixels of the image;
    determining, by the processor, that the at least one predicted organ label requires a correction;
    upon transmitting the at least one predicted organ label to a correction computing device, receiving, by the processor and from the correction computing device, one or more image fragments corresponding to the image, the one or more image fragments comprising at least one value representing at least one correction to the at least one predicted organ label;
    upon transmitting the one or more image fragments and the image to a plurality of reviewer computing devices, receiving, by the processor and from the plurality of reviewer computing devices, a plurality of inputs based on input provided to at least one reviewer computing device, the plurality of inputs indicating the one or more image fragments are correct;
    aggregating, by the processor, a first image fragment into a training data set when a number of the plurality of inputs indicate that the first image fragment of the one or more image fragments is correct and exceeds a threshold; and
    training, by the processor, the machine learning model with the training data set.

2. The method of claim 1, further comprising:
    discarding, by the processor, a second image fragment of the one or more image fragments in response to determining, by the processor, a second number of inputs of the plurality of inputs indicates the second image fragment is correct and does not exceed the threshold.

3. The method of claim 1, further comprising:
    executing, by the processor, the machine learning model using a second image to output at least one second predicted organ label for a second plurality of pixels of the second image;
    determining, by the processor, an accuracy of the output of the at least one second predicted organ label; and
    provisioning, by the processor, the machine learning model in response to determining the accuracy exceeds a second threshold.

4. The method of claim 3, further comprising:
    receiving, by the processor, a third image from a clinic computing device, the third image comprising a third plurality of pixels depicting one or more organs of an individual;
    executing, by the processor, the provisioned machine learning model using the third image to output at least one third predicted organ label for the third plurality of pixels; and
    transmitting, by the processor, the at least one third predicted organ label to the clinic computing device.

5. The method of claim 1, further comprising:
    presenting, by the processor, the image and a second image fragment of the one or more image fragments on a display of a reviewer computing device of the plurality of reviewer computing devices,
    wherein receiving the plurality of inputs comprises receiving, by the processor, a user input indicating the second image fragment is correct.

6. The method of claim 1, further comprising:
    aggregating, by the processor, a subset of the one or more image fragments into the training data set in response to identifying, for each image fragment of the subset, a second number of inputs indicating the image fragment of the subset is correct exceeds the threshold; and
    aggregating, by the processor, the image into the training data set,
    wherein training the machine learning model with the training data set comprises training, by the processor, the machine learning model using only the image fragment, the subset of the one or more image fragments, and the image.

7. The method of claim 1, further comprising:
    maintaining, by the processor, a counter indicating a number of images a reviewer computing device of the plurality of reviewer computing devices or a reviewer user account has reviewed;
    incrementing, by the processor, the counter in response to receiving an input of the plurality of inputs indicating whether the one or more image fragments are correct; and
    transmitting, by the processor, a credit to the reviewer computing device in response to incrementing the counter.

8. The method of claim 7, further comprising:
    comparing, by the processor, a count of the incremented counter to a second threshold,
    wherein transmitting the credit to the reviewer computing device is performed in response to determining, by the processor, the count exceeds the second threshold.

9. The method of claim 1, further comprising:
    maintaining, by the processor, a counter indicating a number of images the correction computing device or a correction user account has corrected;
    incrementing, by the processor, the counter in response to receiving the one or more image fragments identifying corrections to the at least one predicted organ label; and transmitting, by the processor, a credit to the correction computing device in response to incrementing the counter.

10. The method of claim 1, further comprising:
identifying, by the processor, a number of image fragments that have been aggregated into the training data set; and
training, by the processor, the machine learning model with the training data set in response to determining the number of image fragments that have been aggregated into the training data set exceeds a second threshold.

11. A system for training a machine learning model for automatic organ segmentation, the system comprising:
one or more processors configured to:
execute a machine learning model using an image to output at least one predicted organ label for a plurality of pixels of the image;
upon transmitting the at least one predicted organ label to a correction computing device, receive, from the correction computing device, one or more image fragments corresponding to the image, the one or more image fragments comprising at least one value representing at least one correction to the at least one predicted organ label;
upon transmitting the one or more image fragments and the image to a plurality of reviewer computing devices, receive, from the plurality of reviewer computing devices, a plurality of inputs based on input provided to at least one reviewer computing device, the plurality of inputs indicating the one or more image fragments are correct;
aggregate the first image fragment into a training data set when a number of the plurality of inputs that indicate the first image fragment of the one or more image fragments is correct and exceeds a threshold; and
train the machine learning model with the training data set.

12. The system of claim 11, wherein the one or more processors are further configured to:
discard a second image fragment of the one or more image fragments in response to determining a second number of inputs of the plurality of inputs indicates the second image fragment is correct does not exceed the threshold.

13. The system of claim 11, wherein the one or more processors are further configured to:
execute the machine learning model using a second image to output at least one second predicted organ label for a second plurality of pixels of the second image;
determine an accuracy of the output of the at least one second predicted organ label; and
provision the machine learning model in response to determining the accuracy exceeds a second threshold.

14. The system of claim 13, wherein the one or more processors are further configured to:
receive a third image from a clinic computing device, the third image comprising a third plurality of pixels depicting one or more organs of an individual;
execute the provisioned machine learning model using the third image to output at least one third predicted organ label for the third plurality of pixels; and
transmit the at least one third predicted organ label to the clinic computing device.

15. The system of claim 11, wherein the one or more processors are further configured to:
present the image and a second image fragment of the one or more image fragments on a display of a reviewer computing device of the plurality of reviewer computing devices,
wherein the one or more processors are configured to receive the plurality of inputs by receiving a user input indicating the second image fragment is correct.

16. The system of claim 11, wherein the one or more processors are further configured to:
aggregate a subset of the one or more image fragments into the training data set in response to identifying, for each image fragment of the subset, a second number of inputs indicating the image fragment of the subset is correct exceeds the threshold; and
aggregate the image into the training data set, wherein the one or more processors are configured to train the machine learning model with the training data set by training the machine learning model using only the image fragment, the subset of the one or more image fragments, and the image.

17. The system of claim 11, wherein the one or more processors are further configured to:
maintaining, by the processor, a counter indicating a number of images a reviewer computing device of the plurality of reviewer computing devices or a reviewer user account has reviewed;
incrementing, by the processor, the counter in response to receiving an input of the plurality of inputs indicating whether the one or more image fragments are correct; and
transmitting, by the processor, a credit to the reviewer computing device in response to incrementing the counter.

18. The system of claim 17, wherein the one or more processors are further configured to:
compare a count of the incremented counter to a second threshold,
wherein the one or more processors are configured to transmit the credit to the reviewer computing device in response to determining the count exceeds the second threshold.

19. The system of claim 11, wherein the one or more processors are further configured to:
maintain a counter indicating a number of images the correction computing device or a correction user account has corrected;
increment the counter in response to receiving the one or more image fragments identifying corrections to the at least one predicted organ label; and
transmit a credit to the correction computing device in response to incrementing the counter.

20. The system of claim 11, wherein the one or more processors are further configured to:
identify a number of image fragments that have been aggregated into the training data set; and
train the machine learning model with the training data set in response to determining the number of image fragments that have been aggregated into the training data set exceeds a second threshold.

* * * * *